Nov. 23, 1943.       J. F. SULLIVAN       2,335,200
SCALE OR BALANCE
Filed Oct. 20, 1941       2 Sheets-Sheet 1
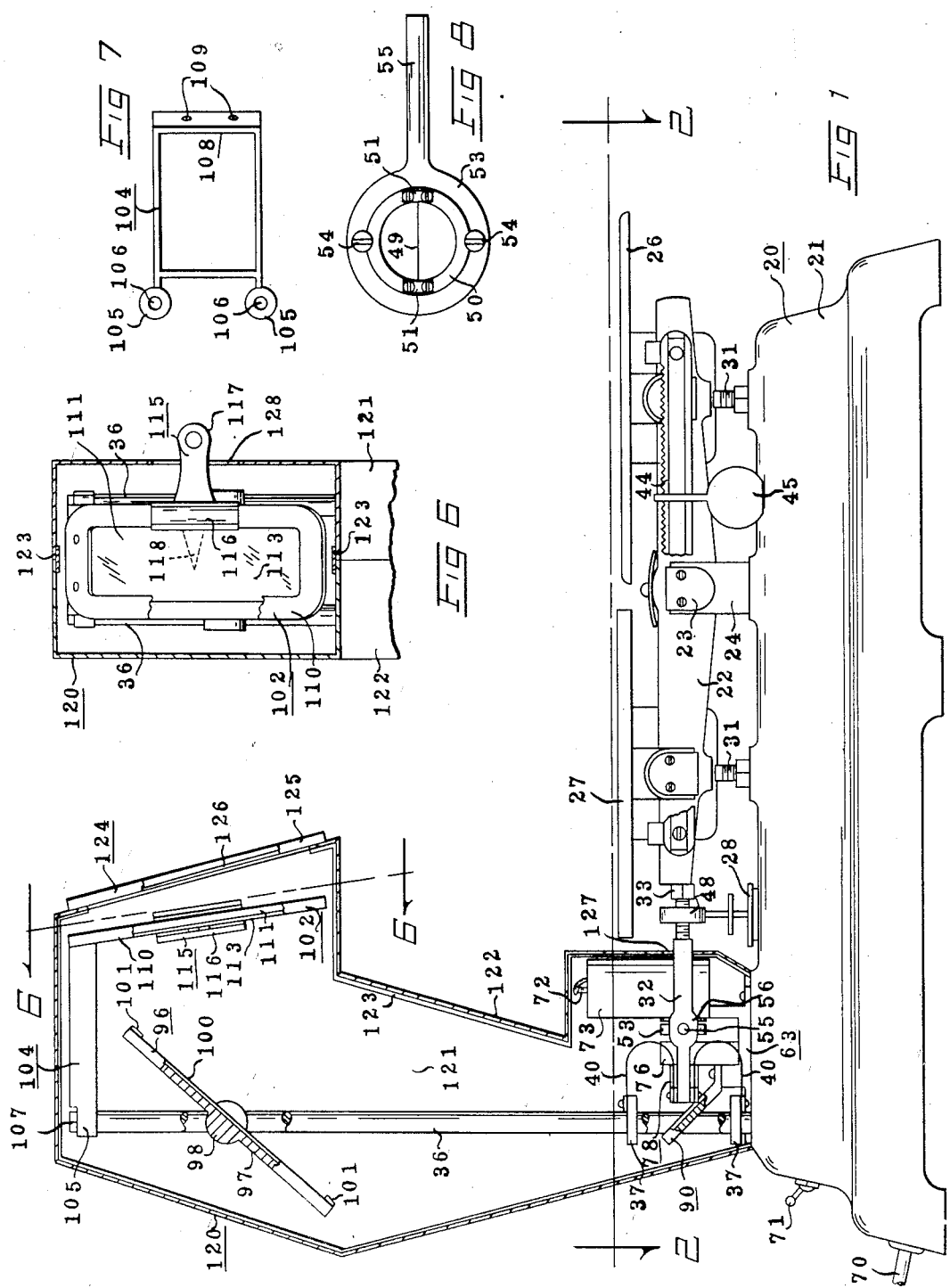
INVENTOR
James F. Sullivan
BY
Warren H. J. Schmieding
ATTORNEY Nov. 23, 1943.  J. F. SULLIVAN  2,335,200
SCALE OR BALANCE
Filed Oct. 20, 1941  2 Sheets-Sheet 2
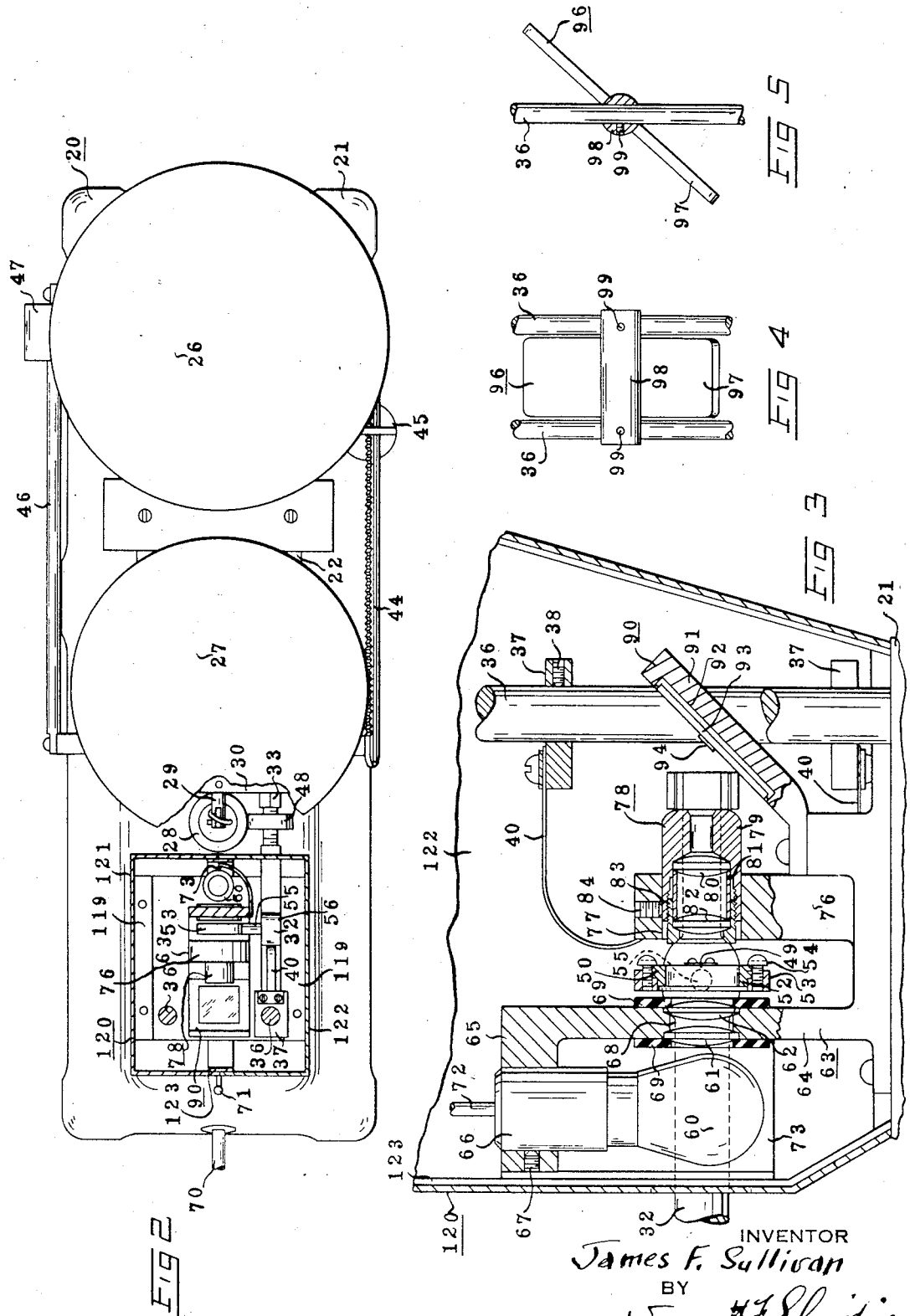
INVENTOR
James F. Sullivan
BY
Warren H.F. Schmieding
ATTORNEY Patented Nov. 23, 1943

2,335,200

UNITED STATES PATENT OFFICE 2,335,200

SCALE OR BALANCE

James F. Sullivan, Columbus, Ohio, assignor to
The Exact Weight Scale Company, Columbus,
Ohio, a corporation of Ohio Application October 20, 1941, Serial No. 415,747

3 Claims. (Cl. 88—24)

The present invention relates to a weighing scale, and more particularly to a weighing scale in which the deflection of the scale beam is indicated by projecting the image of an index member by a mirror or mirrors to a position where it can be readily read, the image being caused to move when the scale beam is deflected.

An object of the invention is to provide a weighing scale having a longitudinally extending scale beam and a load platform and a weight platform on the beam, and mechanism at one end of the beam for projecting an image of an index member vertically and then horizontally onto a translucent screen, the mechanism including two vertically extending posts, which posts support a deflector for reflecting the vertically projected image horizontally, and a bracket carried by the posts for supporting the translucent screen.

Further objects and advantages will be apparent from the following description, reference being had to the accompanying drawings wherein a preferred form of embodiment of the present invention is clearly shown.

In the drawings:

Fig. 1 is a side view of a weighing scale, certain parts of the scale being shown in section and certain other parts being broken away;

Fig. 2 is a view taken on line 2—2 of Fig. 1;

Fig. 3 is a fragmentary view, partly in section, and on a larger scale, of the weighing scale showing mechanism for projecting an image of an indicating member, the view being taken from the opposite side of the weighing scale as viewed in Fig. 1;

Fig. 4 is a fragmentary view of the weighing scale showing a reflector device;

Fig. 5 is a side view, partly in section, of the reflector shown in Fig. 4;

Fig. 6 is a fragmentary view of the weighing scale, the view being taken on line 6—6 of Fig. 1;

Fig. 7 is a plan view of a bracket; and,

Fig. 8 is a view in elevation of an indicating member.

For the purpose of illustrating a preferred form of embodiment of the present invention, I have shown, in the drawings, a weighing scale 20. The weighing scale comprises an elongated base 21, which is preferably formed of a suitable metal casting, and a scale beam 22 is pivotally supported on the base by pivots 23, only one appearing in the drawings. The pivots are supported on a U shaped support member 24, the yoke of the member 24 being attached to the base 21. The scale beam 22 is formed by a rectangular shaped frame, which type is well known and is therefore not shown in detail, and a load platter 26 is pivotally mounted on one end of the beam and a weight platter 27 is pivotally mounted on the opposite end of the beam. The platters 26 and 27 are mounted on the scale beam by a suitable type of pivotal support, and they are maintained in a horizontal plane during oscillation of the beam 22 by a check rod, which rod is not shown since it is a commonly known expedient in the art.

The scale beam 22 is connected at one end with the plunger of a dash pot 28 by a stem 29 that extends outwardly from a cross member 30 of the beam. The dash pot 28 is of conventional design and it functions in the usual manner. Oscillation of the scale beam about its pivots is limited by studs 31 threaded in the base 21. These studs form adjustable stops.

A rod 32, forming an extension of the scale beam, is attached to the cross member 30 of the scale beam by threading one end of the rod in the member. The rod 32 is locked in position by a lock nut 33.

Two vertically extending posts 36 are mounted on the base 21 adjacent the end of the rod 32. These two posts are attached to the base 21 by threading the ends thereof in openings in the base. The diameters of the threaded ends of the posts 36 are smaller than the diameters of the posts proper for forming annular shoulders that engage the top of the base 21 for maintaining the posts 36 upright. One of the posts 36 is substantially in alignment with the end of the rod 32, and two flat blocks 37 are mounted on the latter post. The blocks 37 are provided with openings through which the post extends and the blocks are locked in adjusted position on the post by set screws, one of which is shown at 38, threaded in an opening formed in one side of the blocks. A pair of resilient metallic strips 40 are provided, one end of each of the strips being attached to the end of the rod 32 and the opposite ends of the strips being attached to the blocks 37, respectively. The strips 40 function in the usual manner and they are set properly by positioning the blocks on the posts 36 at predetermined points.

A tare bar 44 is mounted on the scale beam and along one side thereof, and a poise 45 is mounted on the bar. The tare bar and poise are provided for weighing loads weighing fractions of pounds. A slide bar 46 is mounted on the opposite side of the scale beam and a balance member 47 is slidably mounted on this bar. The slide bar and balance member are provided for effecting a tare when it is desired to determine the net weight of material in a container.

Also, a counterweight 48 is threaded on the rod 32 for balancing the scale beam.

I have provided a mechanism at one end of the base 21 for indicating the deflection of the scale beam, the mechanism being arranged to project an image of an index member moved by the scale beam onto a screen that is visible to the scale operator. The index member is supported on the rod 32, and it comprises a relatively small wire 49 that is mounted on an annular member 50 so that it extends transversely of the opening in the latter. The wire 49 is secured to the member 50 by two flat clamps, shown at 51 in Fig. 8. The annular member 50 is formed having a peripheral flange 52 which is inserted in a ring 53. The ring is counterbored at one side and the peripheral edge of the member 50 rests in this counter bored portion. The annular member 50 is secured to the ring 53 by screws 54 that are threaded into the ring 53, the heads of the screws overlapping the peripheral edge of the member 50. The ring 53 is provided with a stem 55, which extends in an opening through an enlarged portion 56 of the rod 32 and the stem is secured in the opening by a set screw, not shown. The annular member 50 is positioned in the ring 53 so that the wire 49 extends in a substantially horizontal direction.

A beam of light is projected in the direction of the wire 49 by an electric lamp 60 and condensing lenses 61 and 62. The lamp is supported on a bracket 63 that is mounted on the base member 21. The bracket 63 includes an upwardly extending wall 64 having a laterally extending portion 65 at the top thereof. The portion 65 is provided with an opening therethrough and a bayonet type light bulb socket 66 is secured in the opening by a set screw 67. The lamp 60 is a low voltage type, such as 6 volts, for example, and it is secured in the socket 66, by the usual bayonet type prongs. The wall 64 of the bracket 63 is provided with an opening 68 therethrough that is in alignment with the lamp 60. The mouths of the opening 68 are flared for forming annular shoulders in which the lenses 61 and 62 engage. These lenses are maintained in the opening 68 by annular fiber discs 69 that are suitably attached to the wall 64.

The lamp 60 is energized by a low voltage transformer, which is mounted on the under side of the base 21 and which is not shown since these types of transformers are well known in the art. The transformer is connected with the usual high voltage current source by cabled wires as indicated at 70. A manual switch, indicated at 71, is provided for controlling energization of the transformer. One side of the low voltage circuit of the transformer is connected with the frame 21 and the other side of the coil is connected with the socket 66 by a connector indicated at 72. When the light bulb 60 is lit, the light rays are condensed by the lenses 61 and 62 and a beam of light is projected toward the wire 49. Preferably, a light shield 73 is secured to the wall 64 of the bracket 63 for purposes that will appear hereinafter.

Bracket 63 is provided with a second vertical wall 76, which wall confronts the wall 64. The wall 76 is provided with an opening 77 therethrough, which opening is axially aligned with the opening 68 in the wall 64. A magnifying lens unit 78 is mounted in the opening 77. The unit 78 includes a tubular member 79 having the inside diameter at one end thereof reduced and the outer portion of a magnifying lens 80 abuts the shoulder formed by the reduction in diameter. A cylinder 81 is inserted in the tubular member and one end thereof abuts the lens 80 for securing the latter in the member 79. The opposite end of the cylinder forms a shoulder against which a second magnifying lens 82 is pressed by a sleeve 83 threaded in the tubular member 79, the sleeve having an annular shoulder that engages the outer edges of the lens 81. The lens unit 78 is secured in the opening 77 by a set screw 84 and it is adapted to project the image of the wire 49 onto a reflector 90, which reflector is inclined at 45 degrees with respect to the projected image for reflecting the image vertically.

The reflector 90 comprises a rigid bracket 91 that is secured to the bracket 63 and it extends upwardly at approximately a 45 degree angle with the top surface of the base 21. The bracket 91 is provided with a rectangular inset portion 92 and a mirror 93 is placed in the offset and retained there by two clips on opposite sides of the bracket, one of the clips being shown at 94.

A reflector 96 is mounted between the posts 36 above the reflector 90. The reflector 96 comprises a flat rectangular plate 97, having an enlarged section 98 formed across the back thereof, which section projects beyond opposite sides of the plate, the projecting portions of the section being cylindrical in shape. The section 98 is provided with openings through each end thereof for receiving the posts 36 and is secured on the posts 36 by set screws 99 thereby fixing the position of the plate 97 intermediate the posts. The axis of the openings through the section 98 extend at a 45 degree angle with the plate so that the under surface of the plate will be at substantially 45 degrees with the top surface of the base 21. The undersurface of the plate 97 is provided with an inset portion for receiving a mirror 100, which mirror is retained therein by clips shown at 101. Thus, the image of the wire 49, projected vertically by the reflector 90, is received by the reflector 96 and projected laterally in a plane that is substantially parallel with the top surface of base 21.

A screen 102 is mounted on a bracket 104 and is arranged to receive the image reflected by the mirror 100. The bracket 104 is rectangularly shaped, having two enlarged lugs 105 at one end thereof, which lugs have openings 106 therethrough for receiving the top ends of the posts 36. The diameters of the upper portions of the openings 106 are reduced for forming a socket for receiving the top ends of the posts 36, and bolts, one of which appears at 107, are extended through each opening 106 and threaded into the upper ends of the posts 36. The opposite end of the bracket 104 is formed having a cross member 108, the surface of which member is inclined slightly with respect to the axis of the openings 106. Cross member 108 is provided with two openings 109 therethrough, by which the screen 102 is secured to the bracket by screws, not shown.

The screen 102 comprises a flat rectangular frame 110 having a rectangular shaped opening 111 therethrough. The frame is offset on one side thereof adjacent the edges of the opening 111, and a rectangular shaped plate of etched glass 113 is mounted on the offset by suitable clips, not shown, which clips press the edge portions of the glass against the frame. The image of the wire 49 is reflected onto the glass 113, and it will appear as a dark, horizontally extending line. Thus, when the scale beam is deflected one way or the other, the image of the wire will move through a much greater distance than the actual movement of the wire by the scale beam.

An adjustable pointer device 115 is mounted on the side of the frame 110, which device comprises a spring clip 116 having jaws that frictionally engage opposite sides of the frame 110 and which jaws can be spread by handles attached thereto, one of which handles is shown at 117. A pointer 118 extends from one of the jaws of the clips and over the surface of the glass 113. It is apparent that the pointer device can be raised or lowered on the frame 110 by merely releasing the clip 116 and sliding it on the frame to the desired position.

The mechanism for projecting the image of the wire 49 and the screen for receiving the image are inclosed by a substantially light proof casing 120. Casing 120 is comprised of two complementary sections 121 and 122, one of which sections has a flange 123 over which the other of the sections slides, for preventing passage of light through the joint of the sections. The sections are attached to the base 21 by flanges 119, which flanges are suitably secured to the base, as by bolts, for example. The end of the casing adjacent the screen 102 is provided with a window 124, which window is in registration with the screen 102. The window 124 includes a frame 125 and a clear glass 126 mounted in the frame. An opening 127 is also formed in the casing 120 through which the rod 32 extends and the shield 73 prevents light from the bulb 66 from being projected through the opening 127. A slot 128 is formed in the casing through which the handles 117 of the clip 116 extend so that the clip 116 can be raised and lowered along the frame 110 from the exterior of the casing.

In operating the scale, the beam 22 is placed in balance and the pointer 118 is made to coincide with the image of the wire 49 on the glass 113 for indicating a balanced condition of the scale beam. The weight desired is placed on the platter 27 and then the material to be weighed is placed on the platter 26, and when the proper quantity of material has been placed on the platter, the image of the wire 49 will coincide with the pointer 118. The image of the wire 49 can be readily observed by the operator of the scale since it appears above the scale beam and substantially opposite the operator as the operator faces the load platform 26. The mechanism for projecting the wire 49 is located at one end of the scale beam and out of the way of the operator. The screen for receiving the image and the reflector for reflecting the image on the screen are mounted on common supports so that proper alignment of the image on the screen is always assured.

Also, by mounting the flex strips at one end of the rod 32 and on one of the posts 36, a compact and easily assembled and adjusted scale mechanism is provided.

While the form of embodiment of the present invention as herein disclosed constitutes a preferred form, it is to be understood that other forms might be adopted, all coming within the scope of the claims which follow.

I claim:

1. In a weighing scale, a base; a beam support on the base; a scale beam pivotally mounted on the beam support; a load platter and a weight platter on said beam, one of said platters being positioned rearwardly of the other, said beam including a part extending rearwardly beyond said one platter; a vertically extending post on said base adjacent the rearward end of said part of the beam; a flex strip connected with the post at one end and with said part of the beam at the other end; means for projecting the image of an index in an upward direction, said means including a member movable by the beam; a reflector mounted on said post and above the scale beam, said reflector being arranged to reflect said image forwardly; a bracket carried by said post and extending forwardly; and a window member carried by said bracket, said window member being in alignment with the reflected image.

2. In a weighing scale, a base; a beam support on the base; a scale beam pivotally mounted on the beam support; a load platter and a weight platter on said beam, one of said platters being positioned rearwardly of the other, said beam including a part extending rearwardly beyond said one platter; a vertically extending post on said base adjacent the outer end of said part of the beam; means for projecting the image of an index in an upward direction, said means including a member movable by the beam; a reflector mounted on said post and above the scale beam, said reflector being arranged to reflect said image forwardly; a bracket carried by said post and extending forwardly; and a window member carried by said bracket, said window member being in alignment with the reflected image.

3. In a weighing scale, a base; a beam support on the base; a scale beam pivotally mounted on the beam support; a load platter and a weight platter on said beam, one of said platters being positioned rearwardly of the other, said beam including a part extending rearwardly beyond said one platter; a vertically extending post on said base adjacent the rearward end of said part of the beam; means for projecting the image of an index in an upward direction, said means including a light projector adjacent said part of the beam and to one side of said platter, an index member and a lens member arranged in optical alignment with one another, one of said members being carried on said part of the scale beam, said light projector being arranged to project a beam of light on the index member and through the lens member, and a reflector in alignment with said light beam and adjacent said post for reflecting said light beam upwardly; a reflector mounted on said post and above the scale beam, said reflector being arranged to reflect said image forwardly; a bracket carried by said post and extending forwardly; and a window member carried by said bracket, said window member being in alignment with the reflected image.

JAMES F. SULLIVAN.